UNITED STATES PATENT OFFICE.

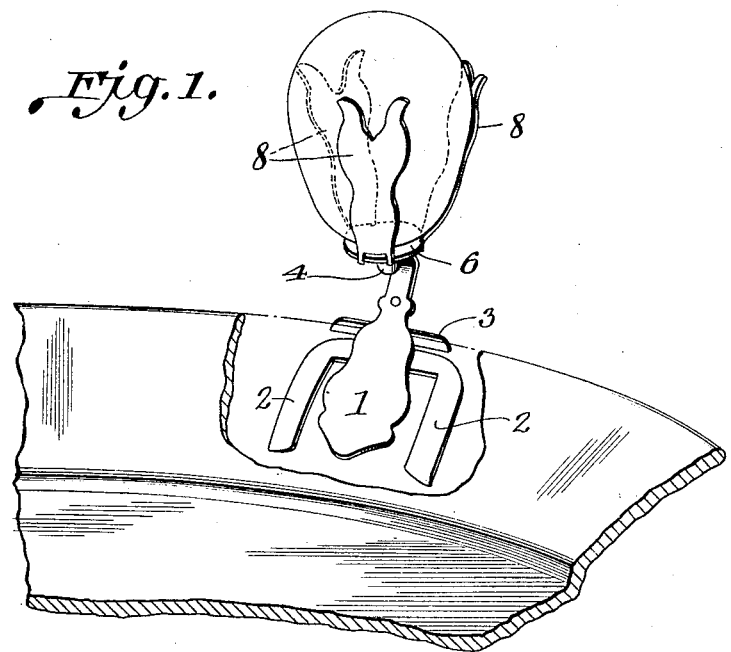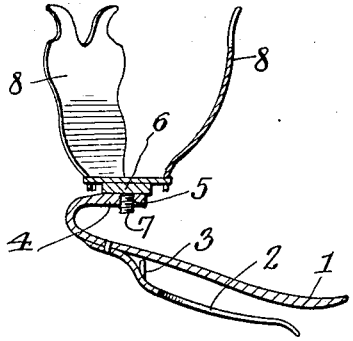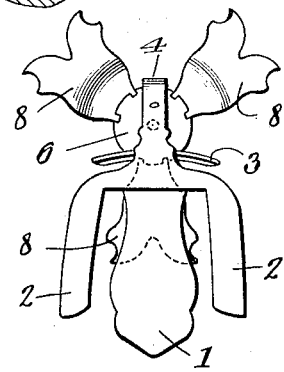

RICHARD F. SCHULZE, OF SHELBYVILLE, INDIANA.

EGG-HOLDER.

1,386,078.         Specification of Letters Patent.     Patented Aug. 2, 1921.

Application filed February 18, 1921. Serial No. 446,008.

*To all whom it may concern:*

Be it known that I, RICHARD F. SCHULZE, a citizen of the United States, residing at Shelbyville, in the county of Shelby and State of Indiana, have invented a new and useful Egg-Holder, of which the following is a specification.

The object of my invention is to provide a novel egg holder having a spring clamp by which it may be easily attached to a plate or other article of this nature. I attain the objects of my invention by the device disclosed in the accompanying drawings, in which—

Figure 1 is a perspective view of the device applied to a plate;

Fig. 2 is a vertical sectional view; and

Fig. 3 is a bottom plan view.

Like numerals designate like parts in each of the several views.

Referring to the accompanying drawings, I provide a plate engaging clamp consisting of the central clamp arm 1 and the forked clamp arms 2; and I preferably provide also laterally extending stop plate 3, to engage the edge of the plate. Member 1 is provided with a reversely bent portion 4, to which the egg holder is attached in some suitable manner. I provide an egg holder consisting of resilient arms 8, carried by a suitable bottom plate 6, which is suitably secured to member 4. I prefer to provide a screw 5 on the egg holder plate 6, removably engaging the threaded opening 7 in member 4. By providing this construction, the cost of manufacturing is reduced and the device may be readily taken apart to clean, or for other purposes.

The manner of using the device will be obvious from the drawings, particularly Fig. 1. The clamping portion of the device is applied to the edge of a plate, and the egg is placed within the resilient arms 8, where the top of the shell may be broken and the egg eaten from the shell.

What I claim is:

In an egg holder, the combination of means for holding an egg, a plate engaging clamp having a reversely bent arm member to which the egg holding means is attached, and a laterally extending plate within the plate engaging clamp to contact with the edge of the plate to prevent damage to the device if pressed on too hard.

RICHARD F. SCHULZE.